United States Patent
Mowery et al.

(10) Patent No.: US 7,453,843 B2
(45) Date of Patent: Nov. 18, 2008

(54) WIRELESS BANDWIDTH AGGREGATOR

(75) Inventors: Keith R. Mowery, Plano, TX (US); William F. Harris, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 1118 days.

(21) Appl. No.: 10/226,015

(22) Filed: Aug. 22, 2002

(65) Prior Publication Data
US 2003/0107998 A1    Jun. 12, 2003

Related U.S. Application Data

(60) Provisional application No. 60/340,737, filed on Dec. 11, 2001.

(51) Int. Cl.
*H04Q 7/00* (2006.01)

(52) U.S. Cl. .................. 370/329; 370/252; 455/450

(58) Field of Classification Search ............... 370/252, 370/328, 329, 335, 341, 342, 441, 465, 468; 455/450, 451, 452.1, 452.2
See application file for complete search history.

(56) References Cited

U.S. PATENT DOCUMENTS

| | | | | |
|---|---|---|---|---|
| 4,616,364 A * | 10/1986 | Lee | ............ | 375/136 |
| 5,586,120 A * | 12/1996 | Cadd | ............ | 370/468 |
| 5,619,493 A * | 4/1997 | Ritz et al. | ............ | 370/330 |
| 5,640,385 A * | 6/1997 | Long et al. | ............ | 370/335 |
| 5,757,789 A * | 5/1998 | Dent | ............ | 370/337 |
| 5,842,117 A * | 11/1998 | Rosenberg et al. | ............ | 455/101 |
| 5,933,607 A * | 8/1999 | Tate et al. | ............ | 370/395.61 |
| 6,049,551 A * | 4/2000 | Hinderks et al. | ............ | 370/468 |
| 6,128,327 A * | 10/2000 | Bird et al. | ............ | 375/132 |
| 6,138,019 A * | 10/2000 | Trompower et al. | ............ | 455/436 |
| 6,181,684 B1 * | 1/2001 | Turcotte et al. | ............ | 370/332 |
| 6,363,099 B1 * | 3/2002 | Sakoda et al. | ............ | 375/131 |
| 6,480,721 B1 * | 11/2002 | Sydon et al. | ............ | 455/464 |
| 6,744,750 B1 * | 6/2004 | Berger | ............ | 370/337 |
| 6,873,597 B1 * | 3/2005 | King | ............ | 370/235 |
| 7,089,014 B2 * | 8/2006 | Brown et al. | ............ | 455/450 |
| 7,113,745 B2 * | 9/2006 | Khayrallah | ............ | 455/41.2 |
| 7,158,493 B1 * | 1/2007 | Uhlik et al. | ............ | 370/329 |
| 2002/0024939 A1 * | 2/2002 | Silventoinen et al. | ............ | 370/328 |
| 2002/0119783 A1 * | 8/2002 | Bourlas et al. | ............ | 455/453 |
| 2002/0173315 A1 * | 11/2002 | Chmaytelli et al. | ............ | 455/453 |
| 2002/0183068 A1 * | 12/2002 | Dunko et al. | ............ | 455/456 |
| 2003/0036408 A1 * | 2/2003 | Johansson et al. | ............ | 455/560 |
| 2004/0146020 A1 * | 7/2004 | Kubler et al. | ............ | 370/329 |
| 2004/0174841 A1 * | 9/2004 | Kubler et al. | ............ | 370/328 |
| 2006/0176868 A1 * | 8/2006 | Schilling | ............ | 370/342 |

\* cited by examiner

*Primary Examiner*—Chi H. Pham
*Assistant Examiner*—Kevin Mew
(74) *Attorney, Agent, or Firm*—William B. Kempler; W. James Brady, III; Frederick J. Telecky, Jr.

(57) ABSTRACT

Wireless communications networks offer rapid installation and good mobility in return for relatively low data bandwidth. The present invention makes use of any additional data bandwidth by combining multiple data packets and transmitting them simultaneously on different communications channels to increase data bandwidth without requiring enlargement of the frequency band or complex data encoding schemes. This is accomplished via the use of multiple radios 611 and 612 at a network adapter 610 and at a base station 625.

7 Claims, 5 Drawing Sheets

WIRELESS BANDWIDTH AGGREGATOR

This patent application claims priority to a provisional application entitled "Wireless Bandwidth Aggregator," Ser. No. 60/340,737, filed Dec. 11, 2001. The provisional application is incorporated herein by reference.

FIELD OF THE INVENTION

This invention relates generally to digital communications and particularly to increasing data bandwidth in a wireless communications network.

BACKGROUND OF THE INVENTION

Wireless communications networks have become wildly popular, due mainly to their ease of installation and use. Additionally, the mobility (the ability of network clients to move freely around the network) offered by the wireless communications networks is extremely attractive, especially for persons with portable computers and personal data/digital assistants. Combine these factors with the fact that new wireless technologies are offering good data bandwidths (currently, wireless communications networks offer data bandwidths of greater than 50 megabits-per-second at small distances) and the net result is that the number of installations of wireless communications networks has rapidly increased.

Unfortunately, wireless communications networks are not without limitations. For example, while the data bandwidths of wireless communications networks have continued to increase, they have not approached the data bandwidth of wired networks. The normal wired Ethernet network has a data bandwidth of approximately 100 megabits-per-second, or twice the data bandwidth of the state-of-the-art wireless network. While Gigabit Ethernet wired networks, offering a gigabit-per-second of data bandwidth, are being installed in many sites. Compounded with a higher price for a wireless communications network's devices, many potential clients are waiting for the cost-performance ratio of wireless communications networks to drop.

One way to make an impact on the cost-performance ratio is to increase the data bandwidth. A common way to increase the data bandwidth is to make more efficient use of the available bandwidth through a more efficient data-encoding scheme. Unfortunately, an upgrade to the encoding method usually means that older hardware is incompatible. Additionally, the more encoding applied to the data, the more sensitive the encoded data is to errors.

An additional way to increase the data bandwidth is to simply use more spectrum bandwidth. For example, in the United States, there is more available bandwidth for use at the five gigahertz Industrial-Science-Medical (ISM) band than at the 2.4 gigahertz ISM band. However, there is a limit to the amount of bandwidth that a single communications network can use, due to governmental regulations. Also, higher frequency signals tend to be more easily blocked by walls, trees, etc., decreasing the effective range of the wireless network.

A need has therefore arisen to increase the data bandwidth of a wireless communications network without significantly increasing the wireless network's sensitivity to noise while maintaining the wireless network's adherence to governmental regulations.

SUMMARY OF THE INVENTION

In one aspect, the present invention provides a method for transmitting a data stream in a wireless communications network comprising the steps of determining available data bandwidth in the wireless communications network, if sufficient available data bandwidth exists, then partitioning the data stream into a first and a second portion, transmitting the first portion using a first communications channel, transmitting the second portion using a second communications channel, else transmitting the data stream using a single communications channel.

In another aspect, the present invention provides a method for dynamically modifying a communication link's data bandwidth comprising the steps of (a) determining available data bandwidth in a wireless communications network, (b) partitioning a data stream into N portions, where N is a number of communications channels such that N*data bandwidth of a single communications channel is less than the determined available data bandwidth, (c) transmitting a k-th portion using a k-th communications channel, where k is a number between 1 and N, and (d) repeating step (c) for all remaining N−1 portions.

In yet another aspect, the present invention provides a wireless device comprising a host interface to couple the wireless device to a digital device, a baseband processor coupled to the host interface, the baseband processor containing circuitry to partition a single data stream into a plurality of portions, a plurality of transmit radios, each transmit radio coupled to the baseband processor, each transmit radio capable of generating radio frequency signals corresponding to a portion of the data stream partitioned by the baseband processor, and an antenna coupled to the plurality of transmit radios, the antenna to transmit the radio frequency signals generated by the plurality of transmit radios.

The present invention provides a number of advantages. For example, use of a preferred embodiment of the present invention increases the data bandwidth of a wireless communications network without incurring a significant increase in the cost of the wireless devices themselves.

Also, the use of a preferred embodiment of the present invention maintains compatibility with older wireless devices in the same wireless communications network. Therefore, there is no need to upgrade all devices in the network in order to maintain the usability of the wireless communications network.

Additionally, the use of a preferred embodiment of the present invention increases the data bandwidth through a simple technique that does not require the use of complex encoding or transmission/reception schemes. This allows the devices to remain simple and keeps their costs low.

Also, the use of a preferred embodiment of the present invention dynamically increases the data bandwidth of a wireless communications network, but when network conditions dictates that some or all of the additional data bandwidth be released, the additional data bandwidth can be released. This allows for the maximization of the number of users on the wireless communications network to communicate when there are a large number of active users on the network. A static data bandwidth increasing method would not permit the release of allocated bandwidth, thereby potentially forcing active users to wait an extended amount of time.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

The following discussion focuses on wireless communications networks that are adherent to the Bluetooth technical standards. The Bluetooth technical standard specifies a short-range wireless communications network that uses a frequency hopping transmission technique and whose intended purpose is a low-power and low-cost replacement for physical cabling. The Bluetooth technical standard is specified in a document entitled "Specifications of the Bluetooth System, Version 1.1, Feb. 22, 2001," which is incorporated herein by reference.

While the discussion focuses on Bluetooth wireless communications networks, the present invention is operable with other wireless communications networks as well. For example, other wireless communications networks that use frequency hopping transmission techniques, such as HomeRF Working Group compliant networks, Institute of Electrical and Electronics Engineers (IEEE) 802.11 frequency hopping networks, and other proprietary networks.

Figure 1:
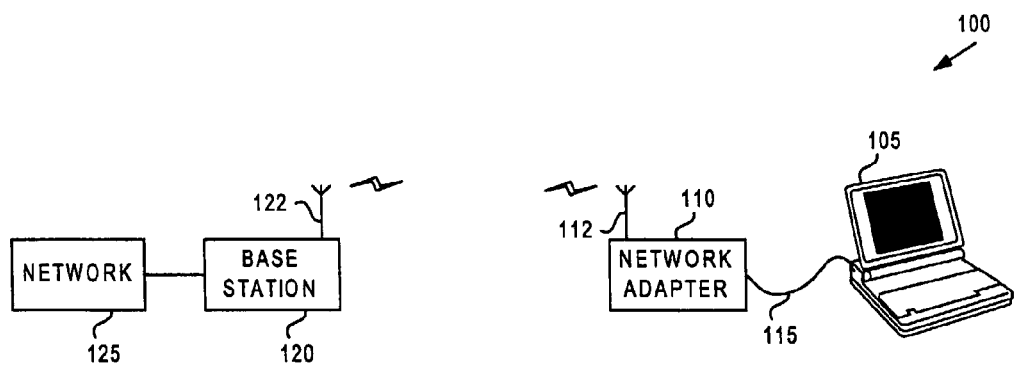
FIG. 1 illustrates a typical wireless communications network with a computer and a wireless network adapter that permits the computer to become a part of the wireless communications network.

Referring now to FIG. 1, the diagram illustrates a typical configuration for a computer 105 connected to a wireless communications network 125 via a wireless network adapter 110. As displayed in FIG. 1, the computer 105 is coupled to the wireless network adapter 110 via a cable 115. The cable 115 may be a proprietary type of cable, specific to the particular brand of computer or wireless network adapter or it may conform to a specified standard, such as a Universal Serial Bus (USB) or an IEEE 1394 cable. Alternatively, the wireless network adapter 110 may be attached to the computer 105 by inserting the wireless network adapter 110 into a compatible slot in the computer 105, such as a PC-Card slot or a Peripheral Component Interconnect (PCI) slot.

The wireless network adapter 110 has an antenna 112 that is used for sending and receiving transmissions over-the-air. The wireless network adapter 110 sends (and receives) transmissions to (and from) a wireless base station 120. The wireless base station 120 is also known by many other names, such as a wireless access point or a controller. The wireless base station 120 also has an antenna 122. The wireless base station 120 is connected to a communications network 125. The connection between the wireless base station 120 and the communications network 125 may be a wired or a wireless connection. The communications network 125 may be a wired or wireless network. For example, the base station 120 may be a part of a local area network that is connected to the Internet via a high-speed connection. Therefore, the computer 105 may have access to both the local area network and the Internet through its wireless network adapter 110.

Although not explicitly displayed, the base station 120 may be located relatively closely to the computer 105 and its wireless network adapter 110 or it may be far away from them. The only limit to the separation between the two is the effective coverage area of the base station 120. For example, Bluetooth wireless networks are typically short-range networks, with an effective coverage area of less than 20 to 30 meters. However, other wireless networks have effect ranges in the hundreds of meters and more.

Bluetooth wireless networks communicate using what is known as frequency hopping. When a transmitter uses frequency hopping, it transmits at one particular frequency for a specified amount of time and then jumps to another frequency and transmits for the same specified amount of time. The time that the transmitter spends at a given frequency is known as the dwell time. The sequence of frequency hops is known as a hop sequence and is known by both the transmitter and any receivers that are expecting to receive the transmissions. According to the Bluetooth technical specifications, there is a plurality of different hop sequences, with each being unique and all appear to be pseudo-random in nature. The particular hop sequence to be used is agreed upon prior to the initial transmission by the transmitter.

Figure 2:
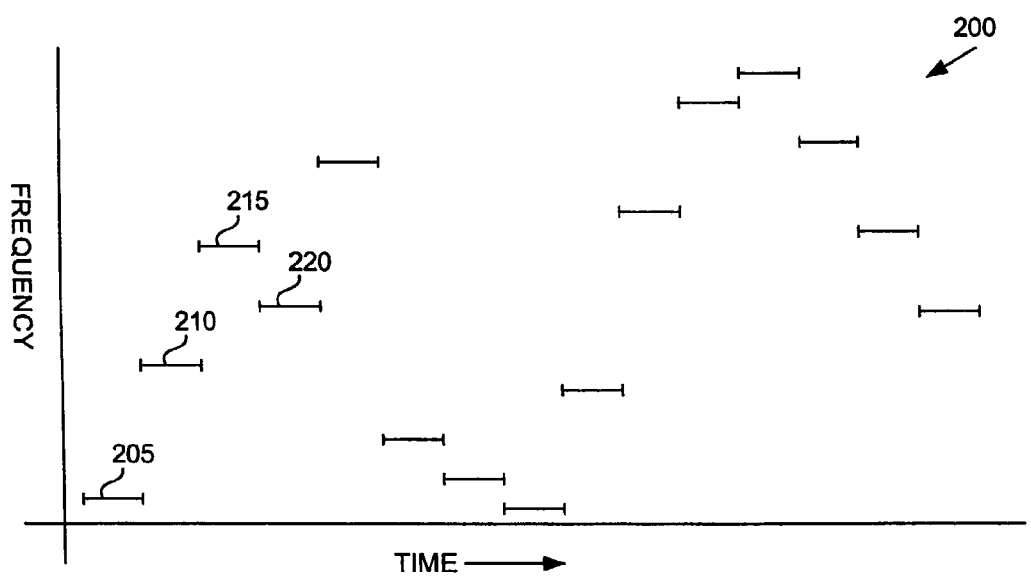
FIG. 2 illustrates a time-frequency data plot showing a period of an exemplary hop sequence of a frequency hopping wireless communications network.

Referring now to FIG. 2, the time-frequency data plot displays a period of an exemplary hop sequence for a frequency hopping wireless communications network. Notice that the actual hop sequence displayed in FIG. 2 is not intended to represent an actual hop sequence in a Bluetooth network or any other frequency hopping wireless communications network. Rather, the intent is to display what a typical hop sequence may look like. As displayed, the period of the hop sequence is fifteen (15 hops. The hop sequence repeats after the completion of its period. Also note that there are hop sequences that derive their hop sequence from a random sequence generator and there may not be what is commonly referred to as a period to its hop sequence.

A first bar 205 displays the dwell time at a first transmit frequency. Once the first dwell time expires, the transmitter moves to a second transmit frequency (displayed as a second bar 210). Note that for the majority of frequency hopping networks, the transmit frequency used in a transmission is indexed by the time of the transmission. For example, if there are no transmissions during the first and second dwell times, then an initial transmission in a third dwell time will use the transmit frequency specified for use during the third dwell time, not the transmit frequency specified for the first dwell time.

Notice that as displayed in FIG. 2, there is more data bandwidth available at any given time than being used. If there is no other network traffic in the wireless communications network, then the unused data bandwidth is simply being wasted. It would be better to allow the existing transmitters to use the unused data bandwidth then to let it go unused.

As discussed previously, a negative of wireless communications networks is their relatively low data bandwidth when compared with wired communications networks. Data bandwidth may be increased by using more advanced (complex) data encoding methods to increase the number of bits transmitted per symbol per hertz. However, increasing the spectral efficiency also makes the wireless communications network more sensitive to errors and noise. Another method that increases the data bandwidth is to simply increase the bandwidth of the communications channel. Unfortunately, radio frequency spectrum is limited and is a regulated commodity. Therefore, the only easy way to increase the communications channel bandwidth is to increase the size of each communications channel and decrease the total number of communications available. However, decreasing the number of communications channels also increases the contention for the same channels and the probability of transmissions from different transmitters colliding with one another. What is needed is a method that permits the dynamic increase of the data bandwidth of a wireless communications network that can drop down in the amount of bandwidth consumed when heavy network conditions require it.

There are many ways to combine multiple communications channels to increase the data bandwidth. For example, if there are distinct communications channels, with each channel being carried on a different frequency range, then it would be possible to partition the data being transmitted into relatively equal portions and transmit each portion on a different communications channel. If the particular wireless communications network uses direct sequence spread spectrum transmitting methods, then it would be possible to spread each portion of the data with a different spreading code and then transmit all of the spread data at one time. If the wireless communications network uses frequency hopping to transmit data, then there are several possible alternatives to achieve increased data bandwidth by combining multiple communications channels.

Figure 3:
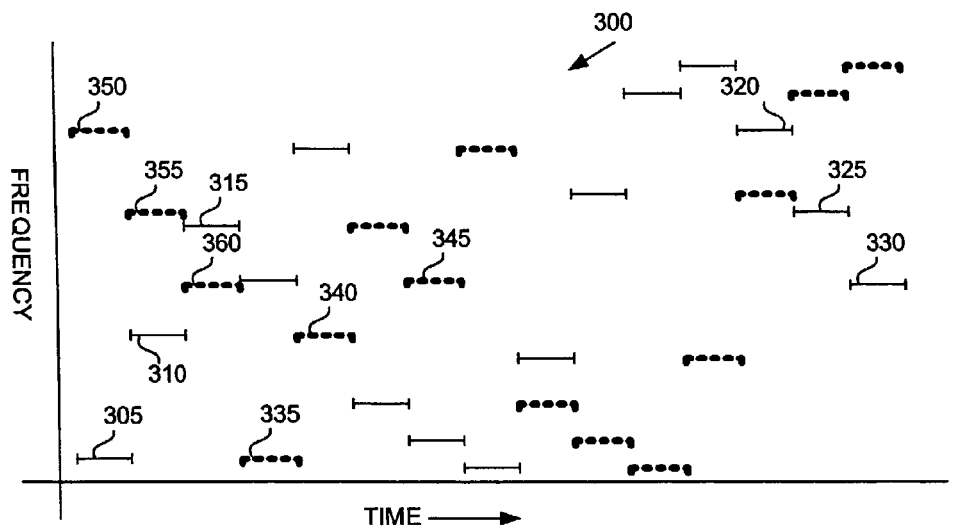
FIG. 3 illustrates a time-frequency data plot showing two time-delayed hop sequences of a frequency hopping wireless communications network supporting the increase of the data bandwidth for a single user according to a preferred embodiment of the present invention.

Referring now to FIG. 3, the time-frequency data plot 300 illustrates two exemplary time-delayed hop sequences of a frequency hopping wireless communications network supporting the increase of the data bandwidth for a single user according to a preferred embodiment of the present invention. The time-frequency data plot 300 displays a single period of two frequency hopping sequences (a first displayed as lightly shaded bars and a second displayed as heavy dashed bars). For example, lightly shaded bars 305, 310, and 315 are the first three frequency hops in the first frequency hopping sequence and heavy dashed bars 350, 355, and 360 are the first three frequency hops in the second frequency hopping sequence.

According to a preferred embodiment of the present invention, the additional hopping sequences used to provide additional data bandwidth are time-delayed versions of a reference hopping sequence that would be used by the wireless network adapter if it were operating in a normal fashion. For example, let a function, f(t), specify the transmitting frequency at an arbitrary time, t, for the reference hopping sequence, then for an additional hopping sequence, n, that is a time-delayed version of the reference hopping sequence, fn(t), would be expressed as: fn(t)=f(t+k), where k is a time value equal to the time-delay between the time-delayed hopping sequence, n, and the reference hopping sequence. Referring back to the two hopping sequences displayed in FIG. 3, the hopping sequence represented by the heavy dashed bars is a time-delayed version of the hopping sequence represented by the lightly shaded bars. As displayed, the hopping sequence represented by the heavy dashed bars is delayed three dwell times with respect to the hopping sequence represented by the lightly shaded bars. For example, the first lightly shaded bar 305 occurs at dwell time one, while the corresponding heavy dashed bar 335 occurs at dwell time four.

At any given time, there are two transmit frequencies. It is important to select the time-delay so that the time-delay is not a multiplier of the period of the hopping sequence. Doing so would result in two (or more) hopping sequences with the same transmit frequencies at the same time. Additionally, it is important to select the time-delay so that during no time period would the same transmit frequency be specified by multiple hopping sequences. This reduces the possibility of collisions in the transmitted data. Since the hopping sequences can be specified a priori, it is possible to select the proper hopping sequence and time-delays to reduce the occurrence of problems like those discussed above.

According to another preferred embodiment of the present invention, it is possible to use entirely different hopping sequences for each of the multiple data streams being transmitted. Once again, since the hopping sequences can be specified a priori, it is possible to select the proper hopping sequences to reduce the likelihood of collisions in the transmitted data. Also, most communications networks have a built-in collision recovery mechanism that permits the recovery from collisions of transmitted data.

Figure 4:
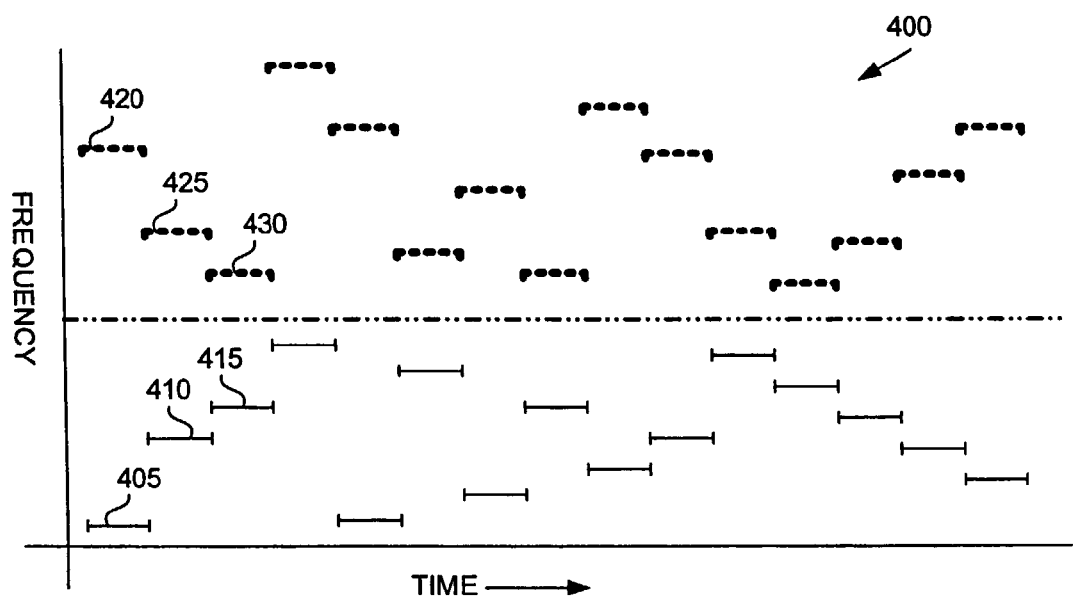
FIG. 4 illustrates a time-frequency data plot show two frequency shifted hop sequences of a frequency hopping wireless communications network supporting the increase of the data bandwidth for a single user according to a preferred embodiment of the present invention.

Referring now to FIG. 4, the time-frequency data plot 400 illustrates two exemplary frequency-shifted hop sequences of a frequency hopping wireless communications network supporting the increase of the data bandwidth for a single user according to a preferred embodiment of the present invention. For wireless communications networks with extended hopping sequences (long periods) or with no apparent periods, it may be difficult to find multiple hopping sequences where at no time are there common transmit frequencies. A solution to this problem may be to partition the available bandwidth into multiple frequency bands and using different hopping sequences for each frequency band. Any hopping sequence can be used, as long as the transmit frequencies for each hopping sequence remain within its frequency band.

The time-frequency plot 400 displayed in FIG. 4 displays the bandwidth being partition into two portions and two different hopping sequences, with each hopping sequence (a first hopping sequence is represented by light bars and a second hopping sequence is represented by dark dashed bars) remaining solely within its own portion of the bandwidth. To further simplify the selection of the hopping sequences, it is possible to use the same hopping sequence (except for the shift in transmit frequency) for each of the two bandwidth portions. According to a preferred embodiment of the present invention, the available bandwidth may be partitioned into as many portions as needed and the data to be transmitted is also partitioned into the appropriate number of portions, with each data portion to be transmitted in each portion of the bandwidth.

Figure 5:
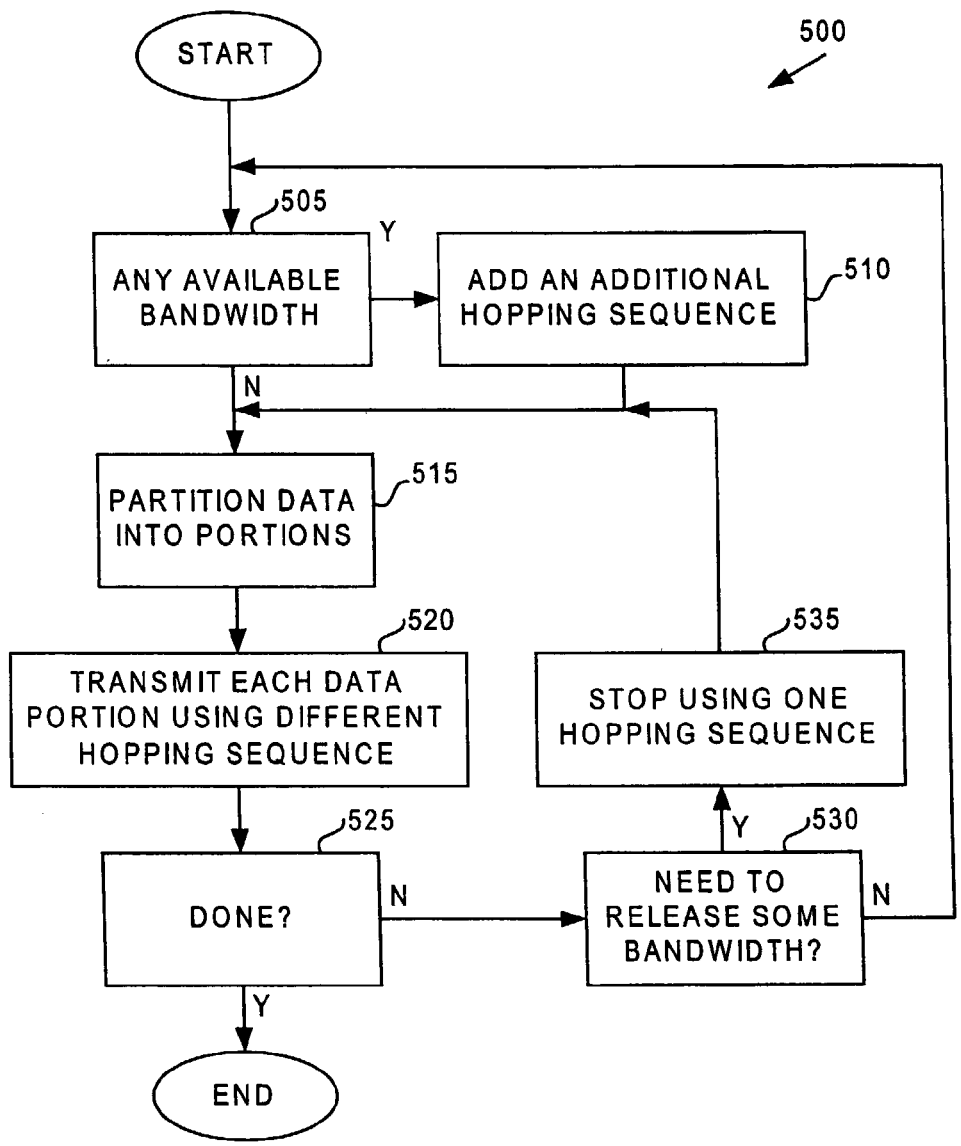
FIG. 5 illustrates a flow diagram of a transmission algorithm supporting dynamic data bandwidth allocation according to a preferred embodiment of the present invention.

Referring now to FIG. 5, the flow diagram illustrates a transmission algorithm 500 with dynamic data bandwidth allocation according to a preferred embodiment of the present invention. According to a preferred embodiment of the present invention, the transmission algorithm 500 executes on a baseband processor of a transmitter for a wireless communications network and is used to maximize the use of available transmission bandwidth. The baseband processor begins the execution of the algorithm 500 when there is data to be transmitted. The baseband processor begins by checking to see if there is any data bandwidth available above that which is allocated to a single device in the wireless communications network (block 505). The baseband processor may check the amount of available bandwidth by polling a base station to request data bandwidth information. The baseband processor may also monitor the amount of network traffic and calculate a performance metric based on its data. The metrics may include the ratio of successful transmissions to failed transmissions, the number of retransmissions, etc. Alternatively, the baseband processor may be aggressive and just increase its data bandwidth without regard for network traffic and drop down its usage if it determines that an inordinate number of its transmissions are failing due to collisions.

If there is extra data bandwidth available, the baseband processor adds an additional hopping sequence (block 510), effectively doubling its data bandwidth. According to a preferred embodiment of the present invention, the baseband processor increases its data bandwidth by adding one hopping sequence at a time, although it is possible for the baseband processor to increase its data bandwidth at a fast rate by adding more than one hopping sequence at a time. This is dependent upon the amount of free data bandwidth available.

After adding an additional hopping sequence, the baseband processor partitions the data that it wishes to transmit into an appropriate number of portions (block 515). The coarseness of the partition may vary depending upon the communications network. The baseband processor may partition the data on a transmit unit basis. For example, if there are two hopping sequences, the baseband processor may assign one transmit unit (a transmit unit be the amount of data that can be transmitted in one network cycle) to one hopping sequence and a second transmit unit to the other hopping sequence. Alternatively, the baseband processor may partition the entire data into two sets of transmit units, one set to each hopping sequence.

After the data is partitioned into an appropriate number of portions, the data may be transmitted (block 520). The transmission can last as long as there is data to transmit or a maximum duration that a single device may transmit at a single time. When the baseband processor completes, it checks to see if is finished (block 525). If it has transmitted all of its data, then it is finished and the algorithm 500 ends. If the baseband processor is not complete, then it checks to see if it needs to release some of the data bandwidth it has claimed (block 530). The baseband processor checks for the available data bandwidth in a manner similar to that as described earlier in block 505. If the baseband processor finds that it needs to release of its claimed bandwidth, the baseband processor can stop the use of one of its hopping sequences (block 535). According to a preferred embodiment of the present invention, the baseband processor decreases its data bandwidth by removing one hopping sequence at a time, although it is possible for the baseband processor to decrease its data bandwidth at a fast rate by removing more than one hopping sequence at a time. Of course, this is dependent upon the amount of free data bandwidth available. After removing one or more hopping sequences, the baseband processor returns to block 515 to repartition any remaining data it has to transmit in accordance with the number of hopping sequences that it intends to use.

If the baseband processor did not need to release any of its claimed data bandwidth (block 530), then it can attempt to obtain even more data bandwidth. The baseband processor moves back to block 505 to check and see if there is any additional data bandwidth that it may use. If there is additional data bandwidth, the baseband processor adds an additional hopping sequence (block 510). The baseband processor continues until it has transmitted all of its data.

As discussed above, the baseband processor may attempt to adjust its data bandwidth as frequently as after the transmission of each transmission unit, although adjusting the data bandwidth with such great frequency results in a large amount of overhead in the partitioning of the data that remains to be transmitted. According to a preferred embodiment of the present invention, the baseband processor will attempt to adjust the data bandwidth at the beginning and at the end of a complete transmission. Alternatively, the base station to which the wireless network adapter is connected may periodically transmit information regarding available network bandwidth and only when the wireless network adapter receives such information does it adjust the data bandwidth.

In a wireless communications system such as a Bluetooth adherent network, it is a relatively simple task to partition the transmission units. This is because each transmission unit (referred to as a packet in a Bluetooth network) is numbered. Therefore, it is easy to partition the packets at the transmit end of the communications link and to rejoin the packets at the receive end of the communications link. At the receive end of the communications link, the baseband processor buffers all incoming transmission units that are addressed to it (or that were transmitted during a time period reserved for the particular receiver) and after the transmission is complete, it can rejoin all of the transmission units.

Figure 6:
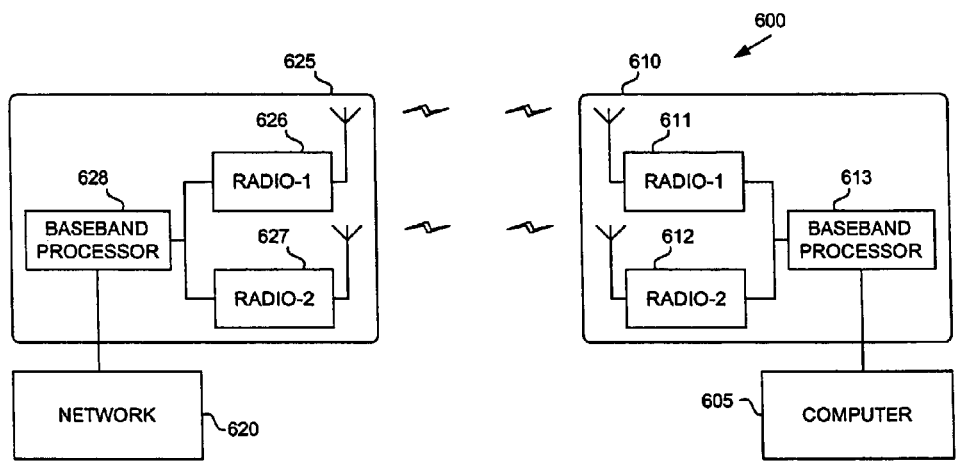
FIG. 6 illustrates a block diagram of a portion of a wireless communications network with a wireless network adapter and a base station with multiple radios to support increasing the data bandwidth of a single user according to a preferred embodiment of the present invention.

Referring now to FIG. 6, the block diagram illustrates a portion of a wireless communications network 600 with a wireless network adapter 610 and a base station 625 modified so that each has multiple radios according to a preferred embodiment of the present invention. The portion of the wireless communications network 600 as displayed is similar to the wireless communications network displayed in FIG. 1 with the exception that some of the functional blocks of the wireless network adapter 610 and the base station 625 are displayed. As displayed in FIG. 6, the wireless network adapter 610 includes two radios 611 and 612 and the base station 625 includes two radios 626 and 627. Although each is displayed with two radios, the wireless network adapter 610 and the base station 625 may have more than two radios. According to a preferred embodiment of the present invention, the number of radios in the base station is more likely to be greater than the number of radios in a single wireless network adapter due to the fact that there may be additional wireless network adapters (not shown) that are communicating with the base station 625. Note that although each radio is displayed with a separate antenna, it is possible for each radio in a given device to share a single antenna.

According to a preferred embodiment of the present invention, when a single antenna is used, an additional circuit (not shown) is located between the outputs of the individual radios (for example, radios 611 and 612) and the single antenna. This circuit is used to combine the individual radio frequency outputs of the radios into a single radio frequency signal. The circuit is commonly referred to as a diplexer. If both the base station 625 and the wireless network adapter 610 permits the combination of multiple communications channels to increase the data bandwidth (as displayed in FIG. 6), then each would have its own diplexer.

The wireless network adapter 610 also includes a baseband processor 613 that is responsible for partitioning the data stream into portions that are to be transmitted in the different hopping sequences along with reforming the data streams from the received hopping sequences. The base station 625 also features a similar baseband processor 628. However, the base station's baseband processor 628 is likely to be more complex than the wireless network adapter's baseband processor 613 due to it having to support more than one wireless network adapter.

Figure 7:
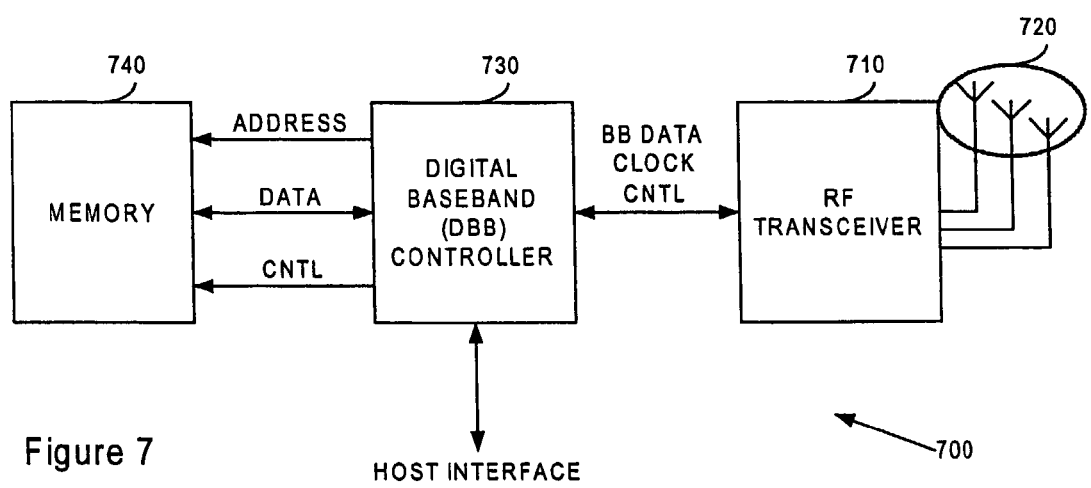
FIG. 7 illustrates a block diagram of a wireless communications device containing multiple radios to support increasing the data bandwidth of a single user according to a preferred embodiment of the present invention.

Referring now to FIG. 7, the block diagram illustrates a wireless communications device 700 containing a multi-radio radio frequency (RF) transceiver 710 according to a preferred embodiment of the present invention. Although not displayed, the RF transceiver 710 has a plurality of radios for use in transmitting multiple streams of data to increase the data bandwidth. The RF transceiver 710 has an antenna (or antennas) 720. It is possible to design a RF transceiver 710 with multiple radios with either a single antenna or multiple antennas, the present invention is operable with either antenna configuration. For example, a full-duplex wireless communications network that will permit each wireless communications device to have up to three times its normal data bandwidth would require that each RF transceiver to have three radios (one for each data stream) and a baseband unit. If the wireless communications network is not full-duplex, then one side of the communications link will not need three radios. For example, if the downlink (from the base station to the wireless communications device) allows only normal data bandwidth, the base station's RF transceiver will have one radio.

The antenna 720 is responsible for receiving analog RF signals transmitted over-the-air. Additionally, the antenna 720 may be used to transmit analog RF signals originating from the wireless communications device 700. The RF transceiver 710 is responsible for taking the analog RF signals received by the antenna 720 and converting it into a digital data stream that is usable by the remainder of the wireless communications device 700. Since the RF transceiver 710 can transmit signals as well as receive them, the RF transceiver 710 is also responsible for converting a digital data stream into an analog signal suitable for transmission. For example, when multiple hopping sequences are being used, at any given time, there will be multiple transmission units, each at a different transmission frequency. The RF transceiver 710 combines each of the different transmit frequencies into a signal analog RF signal and sends it out the antenna 720.

After the RF transceiver 710 receives and converts the analog RF signal into a digital data steam by an analog-to-digital converter (ADC) or a quantizer (neither shown), the digital data stream is transferred to a digital baseband (DBB) controller 730. The DBB controller 730 is responsible for taking the digital data stream and performing any necessary digital signal processing on it to convert it into a stream of user usable data. For example, when multiple hopping sequences are used to transmit multiple streams of data, the DBB controller 730 is responsible for rejoining the transmission units in the proper order. Other examples of processing performed by the DBB controller 730 may include, but is not limited to: digital filtering, data encoding and decoding, error detection and correction, and communications protocol software stack and applications. The DBB controller 730 is coupled to a memory 740 that may contain a read-only memory (ROM), a random access memory (RAM), flash programmable memory, etc. The memory 740 can be used to store the necessary subroutines used in the DBB controller 730, configuration data, scratch memory, etc.

The DBB controller 730 may be coupled to some other digital device via a host interface. The host interface may be a proprietary interface or it may be adherent to an interconnection standard such as: RS-232, universal serial bus, Firewire, IEEE 802.11, PC card, etc. The host interface allows the connection of a digital device to the wireless device 700 via the DBB controller 730. Examples of digital devices include computers, multi-media devices, Internet appliances, storage devices, etc.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is clamed is:

1. A method for dynamically modifying a communication links data bandwidth comprising:
   (a) determining available data bandwidth in a wireless communications network;
   (b) partitioning a data stream into N portions, where N is a number of communications channels such that N*data bandwidth of a single communications channel is less than the determined available data bandwidth;
   (c) transmitting a k-th portion using a k-th communications channel, where k is a number between 1 and N;
   (d) repeating step (c) for all remaining N-1 portions; and further comprising:
   (f) measuring a currently available data bandwidth;
   (g) comparing the currently available data bandwidth with the determined available data bandwidth;
   (h) reducing the value of N if the currently available data bandwidth is less than the determined available data bandwidth;
   (i) increasing the value of N if the currently available data bandwidth is greater than the determined available data bandwidth; and
   (j) repeating steps (b)-(j).

2. The method of 1, wherein the value of N is increased by M, where M is such that M * data bandwidth of a single communications channel is less than a difference between the determined available data bandwidth and the currently available data bandwidth.

3. The method of 1, wherein the value of N is decreased by M, where M is such that M*data bandwidth of a single communications channel is greater than a difference between the determined available data bandwidth and the currently available data bandwidth.

4. The method of 1, wherein the currently available data bandwidth is obtained by polling a base station.

5. The method of 1, wherein the currently available data bandwidth is maintained by a wireless device that is transmitting the data stream.

6. The method of 1, wherein the currently available data bandwidth is obtained by polling a base station.

7. The method of 1, wherein the currently available data bandwidth is maintained by a wireless device that is transmitting the data stream.

* * * * *